(12) United States Patent
McArdle

(10) Patent No.: US 11,539,916 B2
(45) Date of Patent: *Dec. 27, 2022

(54) LOCATION-BASED CONTROL FOR CONFERENCING SYSTEMS

(71) Applicant: Zeller Digital Innovations, Inc., Normal, IL (US)

(72) Inventor: Justin McArdle, Rochester, IL (US)

(73) Assignee: Zeller Digital Innovations, Inc., Normal, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/380,654

(22) Filed: Jul. 20, 2021

(65) Prior Publication Data

US 2021/0352242 A1    Nov. 11, 2021

Related U.S. Application Data

(63) Continuation of application No. 16/909,030, filed on Jun. 23, 2020, now Pat. No. 11,076,126, which is a
(Continued)

(51) Int. Cl.
*H04N 7/14* (2006.01)
*H04N 7/15* (2006.01)
(Continued)

(52) U.S. Cl.
CPC ............. *H04N 7/148* (2013.01); *H04L 12/18* (2013.01); *H04L 65/1073* (2013.01);
(Continued)

(58) Field of Classification Search
USPC ..................................................... 348/14.09
See application file for complete search history.

(56) References Cited

U.S. PATENT DOCUMENTS

2013/0106976 A1    5/2013  Chu et al.
2014/0160225 A1*   6/2014  Baldelli ................. H04N 7/142
                                                    348/14.08
(Continued)

FOREIGN PATENT DOCUMENTS

JP        2016184241 A    10/2016
WO    WO-2016037461 A1     3/2016

*Primary Examiner* — Amal S Zenati
(74) *Attorney, Agent, or Firm* — Harness, Dickey & Pierce, P.L.C.

(57) ABSTRACT

A system controller for use in a videoconferencing system having multiple videoconferencing rooms each including a videoconferencing codec, includes a communication interface in communication with a videoconferencing codec located in the same videoconferencing room as the system controller, a memory configured to store information about the videoconferencing room in which the system controller is located, and a processor configured to execute computer-executable instructions stored in the memory to receive one or more commands transmitted by a mobile computing device in response to determining whether a videoconferencing room in which the system controller is located is within a defined proximity of the mobile computing device. The processor is configured to control, via the communication interface, the videoconferencing codec located in the same videoconferencing room as the system controller, according to the one or more commands to establish or control a videoconference in the same videoconferencing room.

20 Claims, 6 Drawing Sheets

Related U.S. Application Data continuation of application No. 16/661,552, filed on Oct. 23, 2019, now Pat. No. 10,721,438, which is a continuation of application No. 16/192,604, filed on Nov. 15, 2018, now Pat. No. 10,469,801.

(60) Provisional application No. 62/641,848, filed on Mar. 12, 2018, provisional application No. 62/586,426, filed on Nov. 15, 2017, provisional application No. 62/586,420, filed on Nov. 15, 2017, provisional application No. 62/341,860, filed on May 26, 2016.

(51) Int. Cl.
| | |
|---|---|
| *H04W 64/00* | (2009.01) |
| *H04L 65/1083* | (2022.01) |
| *H04L 65/403* | (2022.01) |
| *H04L 12/18* | (2006.01) |
| *H04W 12/64* | (2021.01) |
| *H04W 4/02* | (2018.01) |
| *H04L 65/1073* | (2022.01) |
| *H04W 4/80* | (2018.01) |
| *H04L 65/70* | (2022.01) |
| *H04W 12/06* | (2021.01) |
| *H04W 12/60* | (2021.01) |

(52) U.S. Cl.
CPC ........ *H04L 65/1083* (2013.01); *H04L 65/403* (2013.01); *H04L 65/70* (2022.05); *H04N 7/147* (2013.01); *H04N 7/152* (2013.01); *H04W 4/80* (2018.02); *H04W 12/64* (2021.01); *H04W 64/003* (2013.01); *H04W 4/02* (2013.01); *H04W 4/023* (2013.01); *H04W 12/06* (2013.01); *H04W 12/60* (2021.01)

(56) References Cited

U.S. PATENT DOCUMENTS

| | | |
|---|---|---|
| 2014/0313282 A1 | 10/2014 | Ma et al. |
| 2015/0130891 A1* | 5/2015 | Chen .................... H04N 21/242 348/14.08 |
| 2015/0154521 A1 | 6/2015 | Mu et al. |
| 2015/0193739 A1* | 7/2015 | Min ................ G06Q 10/06314 705/5 |
| 2016/0165056 A1 | 6/2016 | Bargetzi et al. |
| 2016/0180259 A1* | 6/2016 | Marianko ........... H04L 65/1069 705/5 |
| 2017/0099361 A1 | 4/2017 | Digilov et al. |

* cited by examiner

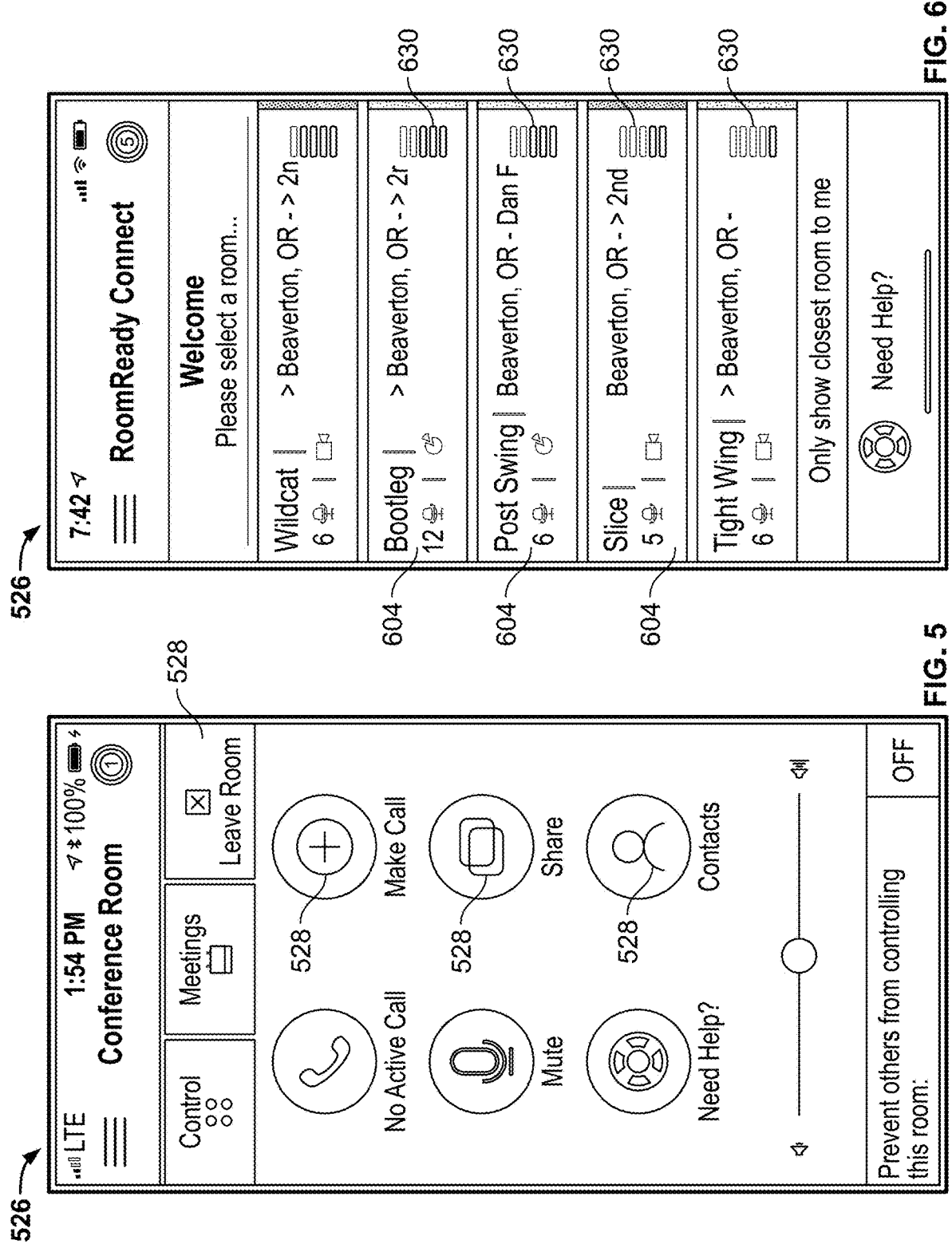

LOCATION-BASED CONTROL FOR CONFERENCING SYSTEMS

CROSS-REFERENCE TO RELATED APPLICATIONS

This application is a continuation of U.S. patent application Ser. No. 16/909,030 filed Jun. 23, 2020, which is a continuation of U.S. patent application Ser. No. 16/661,552 filed Oct. 23, 2019, which is a continuation of U.S. patent application Ser. No. 16/192,604 filed Nov. 15, 2018, which claims the benefit and priority of U.S. Provisional Application No. 62/586,420, filed Nov. 15, 2017, U.S. Provisional Application No. 62/586,426, filed Nov. 15, 2017, U.S. Provisional Application No. 62/641,848, filed Mar. 12, 2018, and U.S. Provisional Application No. 62/641,860, filed Mar. 12, 2018. The entire disclosures of each of the above applications are incorporated herein by reference.

BACKGROUND

This section provides background information related to the present disclosure which is not necessarily prior art.

Various types of videoconferencing systems are known, including those described in U.S. patent application Ser. No. 14/216,183 (now U.S. Pat. No. 9,462,225), filed on Mar. 17, 2014. The entire disclosure of the above application is incorporated herein by reference.

Typically, a videoconferencing room includes a system controller connected to a codec and other components in the room. The system controller includes a user interface such as a keypad, touchscreen and/or handheld remote to control the codec and other components in the room.

Some videoconferencing systems require that a mobile phone application and a codec are registered to a same proprietary cloud-based service (e.g., CISCO SPARK). A server in the cloud may store scheduled conference call information for the registered codec, and transmit information regarding the scheduled conference call to the registered mobile phone application to allow a user of the mobile phone application to initiate the scheduled conference call stored on the server. This approach is limited to specific videoconferencing components and videoconferencing service providers that are registered with the proprietary cloud-based service.

SUMMARY

This section provides a general summary of the disclosure, and is not a comprehensive disclosure of its full scope or all of its features.

According to one aspect of the present disclosure, a method for controlling a conference call in a videoconferencing system is disclosed. The system includes multiple videoconferencing rooms, a server and a mobile computing device, each videoconferencing room includes a videoconferencing codec and a system controller, the server is adapted to store information about each videoconferencing room and in communication with each system controller via one or more wired and/or wireless communication networks, and the mobile computing device includes a user interface. The method includes determining, by the mobile computing device, whether at least one of multiple videoconferencing rooms is within a defined proximity of the mobile computing device, and in response to determining that at least one of the videoconferencing rooms is within the defined proximity of the mobile computing device, and in response to the user selecting said at least one of the videoconferencing rooms via the user interface of the mobile device: transmitting, by the mobile computing device via the server, one or more commands to the system controller located in said at least one of the videoconferencing rooms, to control the videoconferencing codec located in said at least one of the videoconferencing rooms according to the one or more commands to establish or control a videoconference in said at least one of the videoconferencing rooms.

According to another aspect of the present disclosure, a mobile computing device includes a communication interface in communication with a server of a videoconferencing system. The videoconferencing system includes multiple videoconferencing rooms each including a videoconferencing codec and a system controller, and the server is adapted to store information about each videoconferencing room and in communication with each system controller via the one or more wired and/or wireless communication networks. The system includes a memory for storing computer-executable instructions, and a processor configured to execute the computer-executable instructions stored in the memory to: communicate with the server via the one or more wired and/or wireless communication networks to exchange data with the server to determine whether at least one of multiple videoconferencing rooms is within a defined proximity of the mobile computing device. The processor is configured to, in response to determining that at least one of the videoconferencing rooms is within the defined proximity of the mobile computing device: transmit one or more commands, via the server, to the system controller located in said at least one of the videoconferencing rooms, to control the videoconferencing codec located in said at least one of the videoconferencing rooms according to the one or more commands to establish or control a videoconference in said at least one of the videoconferencing rooms.

According to another aspect of the present disclosure, a system controller for use in a videoconferencing system having multiple videoconferencing rooms each including a videoconferencing codec, is located in one of the videoconferencing rooms. The system controller includes a communication interface in communication with a videoconferencing codec located in the same videoconferencing room as the system controller, via one or more wired and/or wireless communication networks, a memory configured to store information about the videoconferencing room in which the system controller is located, and computer-executable instructions, and a processor configured to execute the computer-executable instructions stored in the memory to: receive one or more commands transmitted by a mobile computing device in response to determining whether a videoconferencing room in which the system controller is located is within a defined proximity of the mobile computing device. The processor is configured to control, via the communication interface, the videoconferencing codec located in the same videoconferencing room as the system controller, according to the one or more commands to establish or control a videoconference in said same videoconferencing room.

Further aspects and areas of applicability will become apparent from the description provided herein. It should be understood that various aspects and features of this disclosure may be implemented individually or in combination with one or more other aspects or features. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is an illustration an example user interface of the mobile computing device of FIG. 1.

FIG. 6 is an illustration an example user interface illustrating multiple videoconferencing rooms.

DETAILED DESCRIPTION

Figure 1:
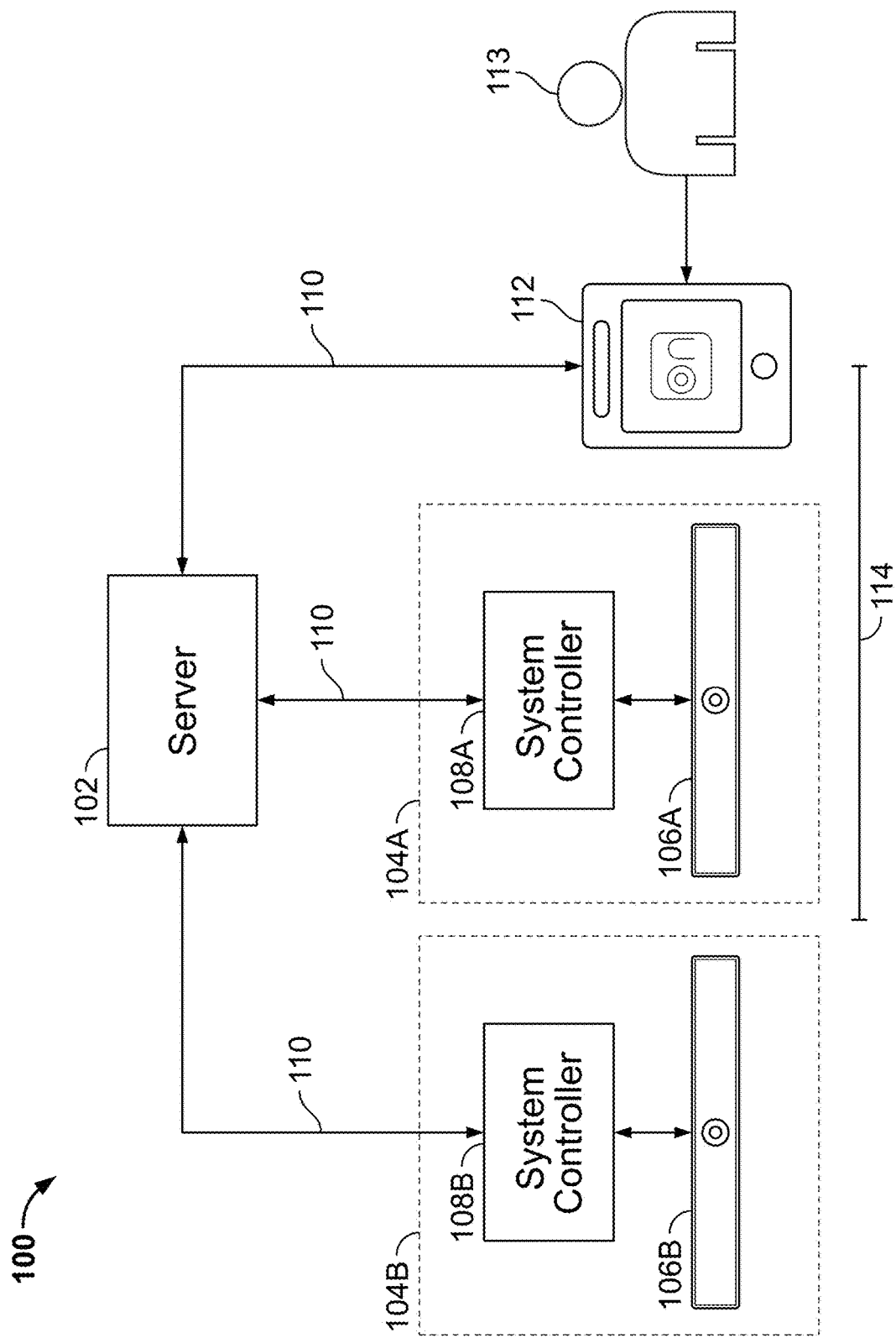
FIG. 1 is a diagram of a videoconferencing system according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A videoconferencing system according to one example embodiment of the present disclosure is illustrated in FIG. 1, and indicated generally by reference number 100. As shown in FIG. 1, the system 100 includes multiple videoconferencing rooms 104A and 104B, and a server 102 adapted to store information regarding each videoconferencing room 104A and 104B.

The videoconferencing room 104A includes a videoconferencing codec 106A and a system controller 108A in communication with the videoconferencing codec 106A via one or more wired and/or wireless communication networks 110 to control the videoconferencing codec 106A. The system controller 108A is in communication with the server 102 via the one or more wired and/or wireless communication networks 110.

Similarly, the videoconferencing room 104B includes a videoconferencing codec 106B and a system controller 108B in communication with the videoconferencing codec 106B via one or more wired and/or wireless communication networks 110 to control the videoconferencing codec 106б. The system controller 108б is in communication with the server 102 via the one or more wired and/or wireless communication networks 110.

The system 100 further includes a mobile computing device 112, such as a smartphone, a tablet computer, a laptop computer, etc. Although FIG. 1 illustrates the mobile computing device 112 as a smartphone, other mobile computing devices can be used similarly.

The mobile computing device 112 includes a user interface (e.g., a keypad, a touchscreen, etc.) to receive input from a user 113, and the mobile computing device 112 is adapted to communicate with the server 102 via the one or more wired/and or wireless communication networks 110. For example, the communication network(s) 110 may include a WiFi network, a cellular network, a public communications network such as the Internet, a private proprietary network, network cables, etc.

The mobile computing device 112 is configured to exchange data with the server 102 to determine whether at least one of the videoconferencing rooms 104A and 104B is within a defined proximity 114 of the mobile computing device 112. Although FIG. 1 illustrates the defined proximity 114 as a physical distance, the defined proximity may include any suitable proximity, such as a wireless signal strength, a physical distance threshold, etc.

The mobile computing device 112 is further configured to, in response to determining that at least one of the videoconferencing rooms 104A and 104B is within the defined proximity 114, and in response to the user selecting said at least one of the videoconferencing rooms 104A and 104B, transmit one or more commands to the server 102.

The server 102 is configured to transmit the one or more commands to the system controller 108A or 108B located in said at least one of the videoconferencing rooms 104A or 104B. The system controller 108A or 108B is configured to control the videoconferencing codec 106A or 106B located in said at least one of the videoconferencing rooms 104A or 104B according to the one or more commands to establish or control a videoconference in said at least one of the videoconferencing rooms 104A or 104B.

The smartphone 112 may exchange data with the server 102 to determine whether at least one of the videoconferencing rooms 104A and 104B is within the defined proximity 114 of the smartphone 112 according to one or more wireless signals received by the smartphone 112. For example, as described further below, the smartphone 112 may exchange data with the server 102 to determine that the videoconferencing room 104A is within the defined proximity 114 of the smartphone 112 according to one or more received wireless beacon signals, a global positioning (GPS) signal, one or more received wireless access point channel signals, etc.

The server 102 may be a remote server based in a cloud (e.g., an AMAZON Web Services (AWS) cloud, etc.) at a separate location from the system controller 108A or 108B, such as a corporate data center server. Alternatively, or in addition a server 102 may be located on the same premises (e.g., on-site) as the system controller 108A or 108B, etc. For example, the server 102 could be a gateway server that acts as a proxy to direct the scheduled conference call information to the correct system controller 108A or 108B. The server 102 may store information regarding the videoconferencing rooms 104A and 104B, such as locations of the rooms, etc.

Figure 2:
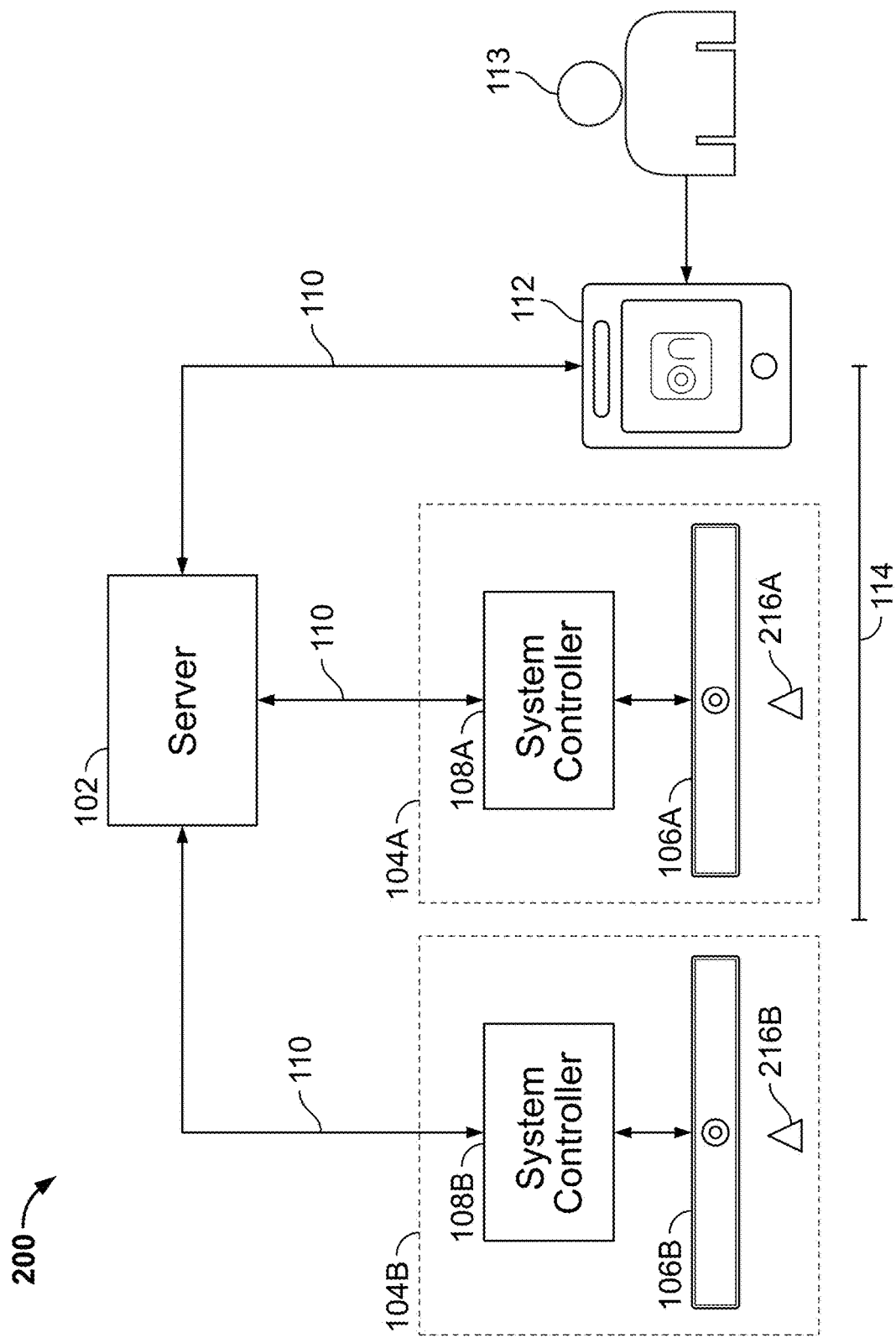
FIG. 2 is a diagram of a videoconferencing system including wireless beacons according to another example embodiment of the present disclosure.

A videoconferencing system according to another example embodiment of the present disclosure is illustrated in FIG. 2, and indicated generally by reference number 200. As shown in FIG. 2, the system 200 is similar to the system 100 of FIG. 1, but further includes two wireless beacons 216A and 216B. The wireless beacon 216A is located in the videoconferencing room 104A and the wireless beacon 216B is located in the videoconferencing room 104B.

Each wireless beacon 216A and 216B includes a unique universal identifier (UUID), and the UUID of each wireless beacon 216A and 216B corresponds to a different one of the videoconferencing rooms 104A and 104B. Specifically, the UUID of wireless beacon 216A corresponds to the videoconferencing room 104A and the UUID of wireless beacon 216B corresponds to the videoconferencing room 104B.

The smartphone 112 may exchange data with the server 102 to determine whether at least one of the videoconferencing rooms 104A and 104B is within the defined proximity 114 of the smartphone 112 by identifying the UUID of one or both of the wireless beacons 216A and 216B, determining whether a signal strength from one or both of the wireless beacons 216A and 216B exceeds a threshold corresponding to the defined proximity 114, and if so, determining the videoconferencing room 104A or 104B corresponding to the identified UUID having a signal strength exceeding the threshold.

In some embodiments, the smartphone 212 may identify the UUID of a nearest one of the wireless beacons 216A and 216B according to signal strengths from the wireless beacons 216A and 216B, may identify the UUID of only the wireless beacons 216A and 216B having the strongest signal strength (e.g., a strongest relative signal strength indicator (RSSI)), etc.

For example, the smartphone may determine whether an RSSI value from each of the wireless beacons 216A and 316B is above a specified threshold, may determine whether an estimated distance according to the RSSI value is within a physical distance threshold such as about ten feet, about fifty feet, about ten meters, etc. Once the smartphone 212 identifies a UUID, the smartphone 212 may transmit the identified UUID to the server 102 determine which videoconferencing room 104A and 104B corresponds to the identified UUID.

The beacons 216A and 216B each broadcast their UUID into the local environment (e.g., the videoconferencing rooms 104A or 104B, etc.). The smartphone 112 may scan for the UUIDs and associate a proximity of the smartphone 112 to the beacons 216A and 216B based on a relative signal strength indicator (RSSI) algorithm, which may be stored in the smartphone 112.

The RSSI allows for approximation of distance between the smartphone 112 and the source of the signal (e.g., one of the wireless beacons 216A and 216B). When the smartphone 112 is within a defined proximity distance threshold (e.g., about ten feet, about fifty feet, about ten meters, etc.) of one of the wireless beacons 216A and 216B, the smartphone 112 may resolve the address of the UUID received from the wireless beacon to a corresponding videoconferencing room 104A or 104B through a secure sockets layer (SSL) transport layer security (TLS) connection to the server 102 and then to the corresponding system controller 108A or 108B. For example, the secure SSL TLS connection may be established through AMAZON web services (AWS), etc.

The wireless beacons 216A and 216B may include any suitable wireless beacon devices, such as a short-range wireless communication (e.g., BLUETOOTH) beacon, a WiFi beacon, a radio-frequency identification (RFID) beacon, a near-field communication (NFC) beacon, etc. The UUID may include one or more of a major UUID, a minor UUID, an iBeacon identifier, an Eddystone (e.g., a UID, a uniform resource locator (URL), a TLM), an encrypted Eddystone (e.g., an EID, an ETLM), etc.

In some embodiments, each wireless beacon 216A and 216B may be associated with its corresponding system controller 108A and 108B by having a same Eddystone URL address. For example, each system controller 108A and 108B may use a different Eddystone URL, which may be configured and loaded on the system controllers 108A and 108B during setup of the system controllers 108A and 108B, etc. Specifically, during the setup process a unique Eddystone URL address may be assigned and paired to a media access control (MAC) address of one of the system controllers 108A and 108B, which may be the same as the Eddystone URL of the corresponding wireless beacon 216A or 216B.

Once a smartphone 112 recognizes one or more of the wireless beacons 216A and 216B, the smartphone 112 may check whether the user 113 has appropriate privileges to access the videoconferencing rooms 104A or 104B corresponding to the recognized beacons 216A or 216B.

Each videoconferencing room 104A and 104B may allow access to anyone with a login credential (e.g., a login credential of a control application on the smartphone 112), to only users that have an authenticated email address from a specific domain (e.g., john.doe@nike.com where nike.com is the specific domain), to only a predefined list of users, to only a single user for a private office, etc. As described further below, the smartphone 112 may also check (e.g., with the server 102) whether a GPS location of the smartphone 112 is within a specific geographic location (e.g., a GPS location) where the wireless beacon 216A or 216B is located to inhibit "spoofing" or unauthorized location access.

Figure 3:
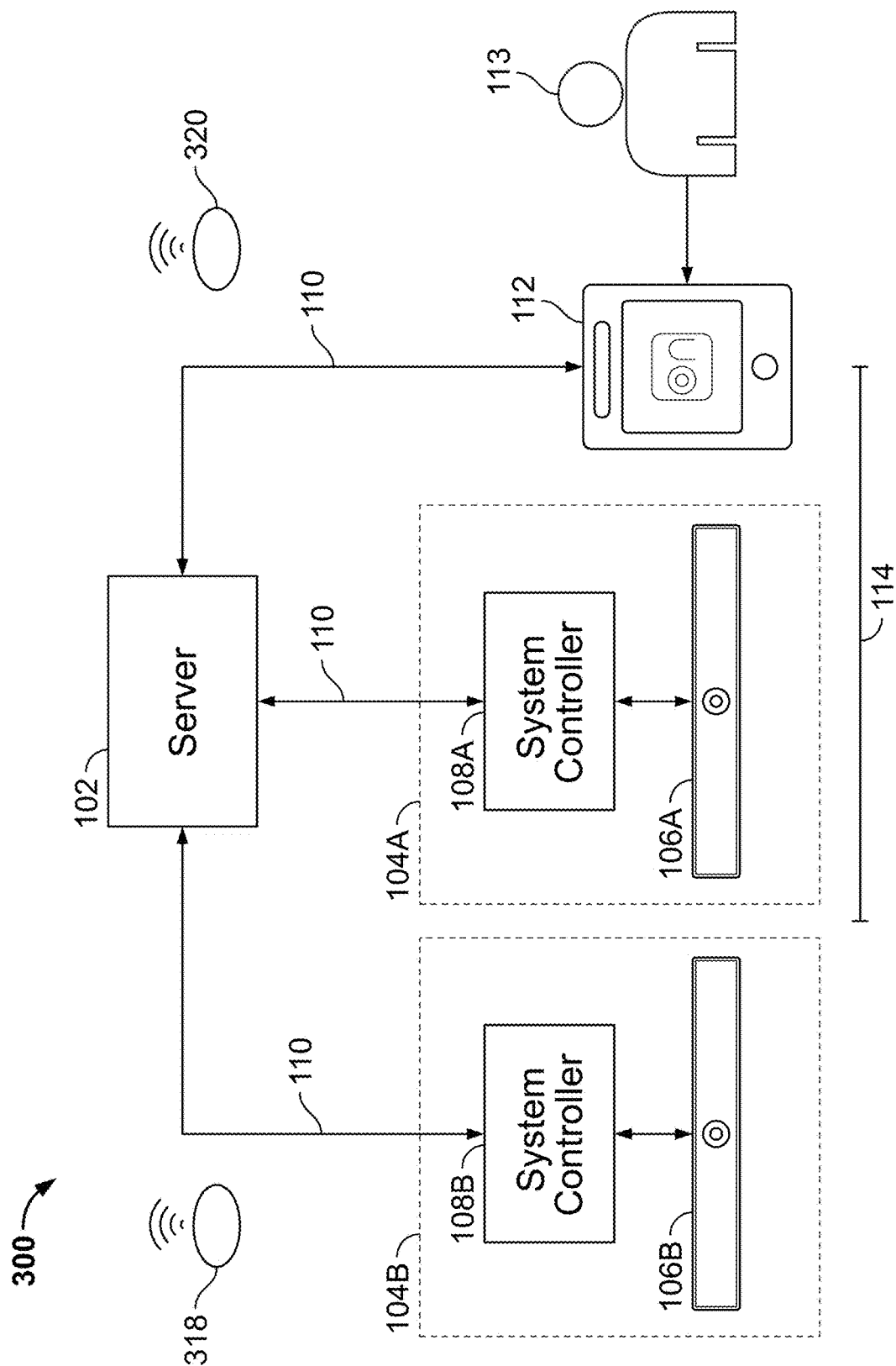
FIG. 3 is a diagram of a videoconferencing system including wireless access points according to another example embodiment of the present disclosure.

A videoconferencing system according to another example embodiment of the present disclosure is illustrated in FIG. 3, and indicated generally by reference number 300. As shown in FIG. 3, the system 300 is similar to the system 100 of FIG. 1, but further includes two wireless access points 318 and 320, such as WiFi routers, etc.

The wireless access point 318 and 320 may be separate from the videoconferencing rooms 104A and 104B as shown in FIG. 3, although the wireless access points 318 and 320 could be located in the videoconferencing rooms 104A and 1046 in another embodiment.

Each wireless access point 318 and 320 may include one or more wireless signal channels, and the smartphone 112 may receive different signal strengths of the one or more wireless signal channels of each access point 318 and 320 depending on a position and/or distance of the smartphone 112 relative to each wireless access point 318 and 320.

Similarly, each videoconferencing room 104A and 104B may be associated with a defined wireless signal strength signature corresponding to received signal strengths from each of the multiple wireless access points 318 and 320 at the locations of the videoconferencing rooms 104A and 1046.

For example, the videoconferencing room 104B may receive a strong wireless signal strength from the wireless access point 318 because the videoconferencing room 104B is close to the wireless access point 318, and may receive a weak wireless signal strength from the wireless access point 318 because the videoconferencing room 104B is far from the wireless access point 318. Similarly, the videoconferencing room 104A may receive medium wireless signal strengths from the wireless access points 318 and 320 because the videoconferencing room 104A is located at a medium distance from both wireless access points 318 and 320.

A correspondence relationship table (e.g., a heat map, etc.) may be generated that includes a defined wireless signal strength signature for each videoconferencing room 104A and 104B according to the received signal strengths from each of the wireless access points 318 and 320 at the locations of the videoconferencing rooms 104A and 104B. The correspondence relationship table may be stored at the server 102, the smartphone 112, etc., and can be used to identify a location of smartphone 112.

Figure 4:
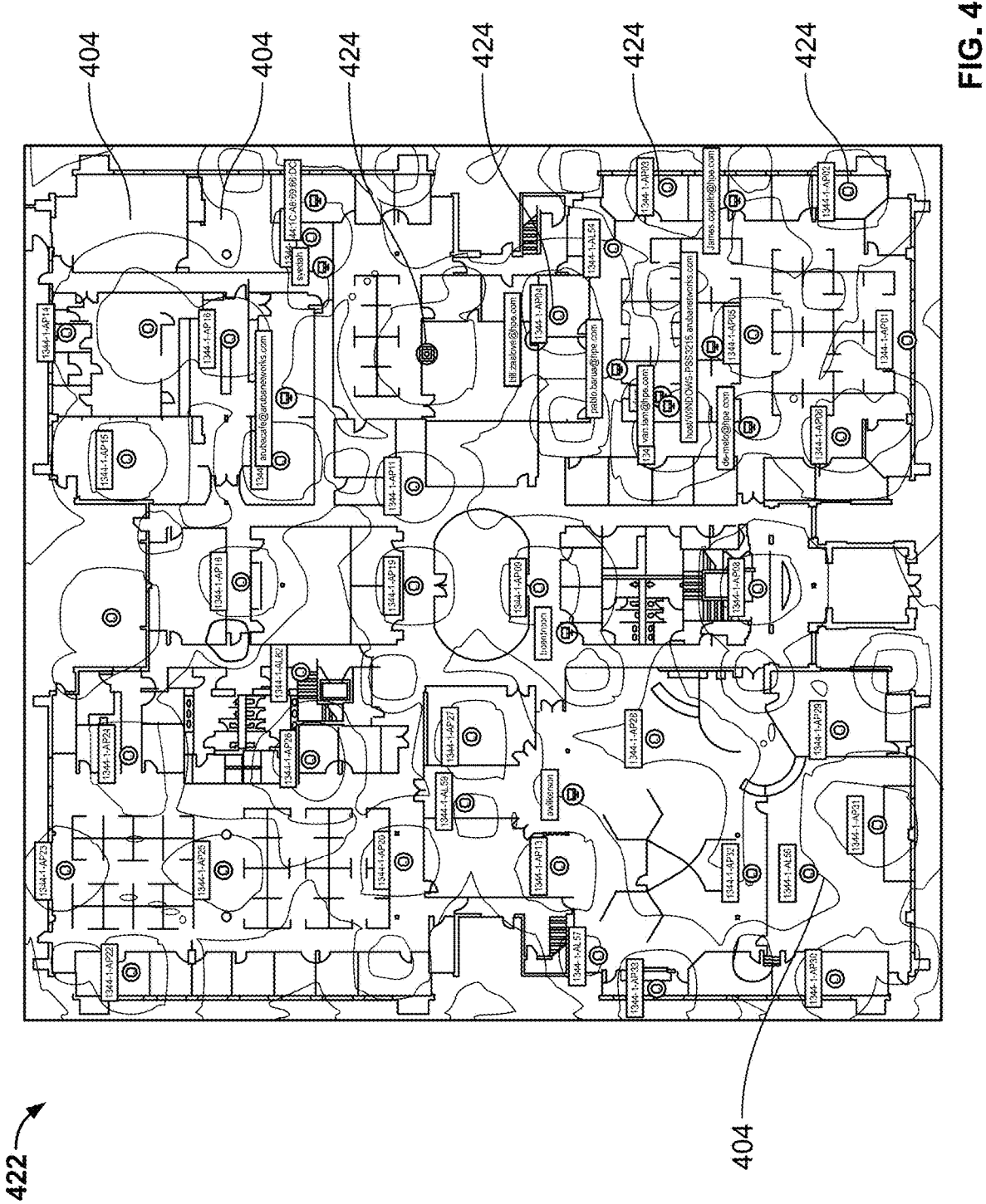
FIG. 4 is an illustration of an example wireless signal strength map for a videoconferencing system.

FIG. 4 illustrates an example heat map 422 including multiple wireless access points 424 and multiple videoconferencing rooms 404. The heat map 422 illustrates strength of WiFi signals from the wireless access points at different locations among the multiple videoconferencing rooms 404.

The smartphone 112 can use its wireless card (e.g., WiFi antenna, etc.) to take a local measurement of received WiFi signal strengths, and then compare the local measurement values to the heat map 422 to determine a location of the smartphone 112 relative to the multiple videoconferencing rooms 404.

Referring back to FIG. 4, the smartphone 112 can obtain a received signal strength for each of the wireless access points 318 and 320, and transmit data (e.g., the received signal strengths) with the server 102 to determine whether at least one of the videoconferencing rooms 104A and 104B is within the defined proximity 114 of the smartphone 112 by identifying the videoconferencing room 104A or 104B having a defined wireless signal strength signature corresponding to the received signal strengths obtained by the smartphone 112.

For example, if the smartphone 112 receives medium signal strengths from each wireless access point 318 and 320, the smartphone 112 and/or server 102 may determine the smartphone 112 is located at or within the defined proximity 114 of the videoconferencing room 104A. Similarly, if the smartphone 112 receives a strong signal strength from the wireless access point 318 and a strong signal strength from the wireless access point 320, the smartphone 112 and/or server 102 may determine the smartphone 212 is located at or within the defined proximity 114 of the videoconferencing room 104B.

Although FIG. 3 illustrates two wireless access points 318 and 320, other embodiments may include more or less access points, having more or less wireless signal channels (e.g., at least five wireless signal channels in total, at least twenty wireless signal channels in total, etc.). The correspondence relationship table can specify signal strengths all wireless signal channels for each videoconferencing room, and the smartphone 112 and/or server 102 may determine the smartphone 112 is located within a defined proximity distance of a specific videoconferencing room 104A or 104B when the obtained signal strengths of the smartphone are within a tolerance threshold of the specified signal strengths of one or more (or all) wireless signal channels for one of the videoconferencing rooms 104A or 104B. For example, the tolerance threshold may be within five percent of the specified signal strength for each wireless signal channel, within ten percent, etc.

In some embodiments, each of the videoconferencing rooms 104A and 104B is associated with a global positioning system (GPS) location corresponding to a location of the videoconferencing room 104A or 1048. The smartphone 112 may obtain a GPS location of the smartphone, and exchange data with the server 102 to determine whether at least one of the videoconferencing rooms 104A and 104B is within the defined proximity of the smartphone 112 by determining whether one of the videoconferencing rooms 104A or 104B has an associated GPS location within the defined proximity of the GPS location of the smartphone 112.

For example, the smartphone 112 and/or the server 102 may compare the GPS location of the smartphone 112 to the GPS locations of the videoconferencing rooms 104A and 104B to determine the nearest one of the videoconferencing rooms 104A and 104B, to determine whether one of the videoconferencing rooms 104A and 104B is within a defined proximity distance (e.g., about ten feet, about fifty feet, about ten meters, etc.) of the smartphone 112, etc.

The example approaches described above for determining whether at least one of the videoconferencing rooms 104A and 104B is within a defined proximity of the smartphone 112 may be used individually or in combination with one another. For example, the smartphone 112 and/or server 102 could determine whether at least one of the videoconferencing rooms 104A and 104B within a defined proximity distance of the smartphone 112 using both GPS location and wireless beacons, both GPS location and wireless access point signal strengths, both wireless beacons and wireless access point signal strengths, etc. In some embodiments, the smartphone 112 and/or server 102 could determine whether at least one of the videoconferencing rooms 104A and 104B is within a defined proximity distance of the smartphone 112 using all three of GPS location, wireless beacons and wireless access point signal strengths.

In some embodiments, the GPS location of the smartphone 112 can be used to confirm the smartphone 112 is actually located near the wireless beacon, and is not instead providing a UUID that came from a source other than the wireless beacon. Therefore, the GPS location of the smartphone 112 can add an additional layer of security to the videoconferencing systems 100, 200 or 300.

Many control applications exist for videoconferencing components from different manufacturers, but these control applications are often fragmented and not part of a complete system. In those cases, the user must operate multiple different applications to control different videoconferencing components in the videoconferencing system. In an environment having multiple conferencing systems, a user typically must instruct an application to control a specific one of multiple systems. This can lead to problems where the user may accidentally control a system that the user does not intend to control.

As shown in FIG. 5, the smartphone 112 may include a control application such as a smartphone app, which presents a user interface (PUI) 526 to the user 113. The user interface 526 can allow the user 113 to transmit one or more commands to the system controllers 108A or 1086 via the server 102, in order to control the videoconferencing codecs 106A or 106B. In some embodiments, the user 113 may only be able to transmit commands to a system controller that has been identified within a defined proximity of the smartphone 112.

For example, the user interface 526 includes multiple control buttons 528 each corresponding to a different command for the system controllers 108A or 108B, the videoconferencing codecs 106A or 106B, etc. The user interface 526 may be consistent across different types of system controllers, videoconferencing codecs, etc., to the user 113 does not need to learn different control interfaces for different controllers or components. One example smartphone app is ROOMREADY CONNECT distributed by Zdi, Inc. of Normal, Ill.

In some embodiments, the system controller and the smartphone app may not need to be on the same production network (e.g., inside of a business firewall, etc.) to pass commands from the smartphone app to the system controller via a server. Therefore, there may be no need for a custom user interface for every videoconferencing system, or custom source code written for every videoconferencing system based on different application programming interfaces (APIs) and videoconferencing components for different videoconferencing rooms (e.g., no need for a different dedicated room interface for each different videoconferencing room, etc.).

The user interface 526 may allow the user to control one of multiple videoconferencing rooms 604 determined to be within a defined proximity of the smartphone 112, as shown in FIG. 6. The user interface 526 may display a signal strength 630 corresponding to each videoconferencing room 604.

As shown in FIG. 6, the user interface 526 may display a name of the identified videoconferencing room 604, an occupancy status of the videoconferencing rooms 604 (e.g., occupied, vacant, etc.), available technologies in the videoconferencing rooms 604 (e.g., video enabled, audio enabled, presentation enabled, etc.), a number of seats available in the videoconferencing room 604, the signal strength 630, etc.

Optionally, the system controller 108A or 108B can store a local room calendar that includes a reservation schedule for the videoconferencing room 104A or 104B in which the system controller 108A or 108B is located. The system controller 108A or 108B may authenticate to a resource calendar (e.g., an OFFICE 365 calendar, a GOOGLE calendar, etc.). The authentication credentials can be stored locally with the system controller 108A or 1086.

The system controller 108A or 108B may synchronize its local room calendar with the resource calendar at periodic intervals (e.g., every three minutes, etc.), in response to a schedule update event (e.g., a new room reservation request), etc., to maintain substantially real-time updates. The resource calendar may be considered as a "source-of-truth" (SOT).

The smartphone 112 can poll available system controllers system controller 108A or 108B (e.g., though a secure and encrypted channel) for local conferencing room information. In some embodiments, the local room information may only be available while the smartphone 112 is within a defined proximity (e.g., about fifty feet, etc.) of the videoconferencing room.

Figure 7:
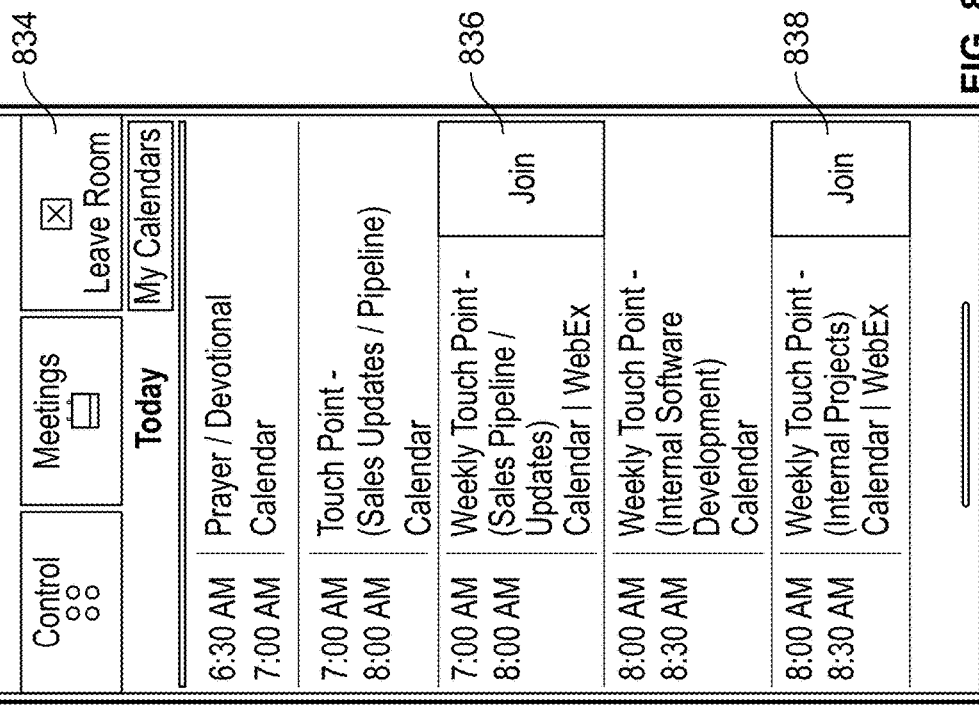
FIG. 7 is an illustration an example user interface illustrating videoconferencing room reservations.

If the videoconferencing room is available without any current calendar events scheduled, the smartphone 112 can prompt a user to reserve the room for a desired duration 632, as shown in FIG. 7. For example, the user may be able to reserve the room in increments (e.g., fifteen minute increments, etc.) up to a threshold (e.g., up to an hour, etc.).

Once a reservation request is transmitted from the smartphone 112 to the system controller 108A or 108B, the system controller 108A or 108B can update the resource calendar with a new reservation. The new reservation may round the desired increment up to the next closet interval. For example, if a conferencing room is booked for a fifteen minute meeting at 10:05, the calendar may be updated to include a reservation from 10:05 to 10:30.

In some embodiments, an optional visual indicator may be associated with (e.g., in connection with, attached to, mounted on, etc.) the system controller 108A or 108B. For example, the visual indicator may include a multi-color light emitting diode (LED). The indicator can illuminate a discrete color that is reported back to the smartphone 112 to provide wayfinding to the correct system controller 108A or 1088 and associated videoconferencing room 104A or 104B, to confirm the intended videoconferencing room was correctly reserved, etc. The visual indicator may stay on for a specified time period (e.g., one minute, etc.) before turning off.

Once the smartphone 112 completes a reservation of a videoconferencing room associated with the system controller 108A or 108B, the conferencing room controls can be presented to the user in the form of a personal user interface on a smartphone app of the smartphone 112. Optionally, the smartphone may automatically connect to the server 102 to begin controlling the system controller 108A or 108B once the reservation is completed. In other embodiments, the smartphone 112 may wait for activation of a button on a user interface, etc. before connecting to the server 102 to begin controlling the system controller 108A or 1088, etc.

The controls may include any suitable room functions such as, initiating a video and/or audio conferencing call, ending a call, sharing a presentation, muting and/or unmuting a microphone, controlling volume, reporting a problem, accessing contacts, accessing a calendar, locking a room, etc. For example, the videoconferencing system can also include a conferencing component coupled to the conferencing system controller. The system controller can control the videoconferencing component according to the one or more commands transmitted by the smartphone. As one example, a conferencing system controller (e.g., a ROOM-READY GO controller distributed by Zdi, Inc. of Normal, Ill.) may issue application programming interface (API) commands to a videoconference component, such as a television, a monitor, an integrated computer display, a camera, an audio digital signal processor (DSP), a speaker, an audio-visual (AV) switch, and a cable box, etc. As described above, example commands may include turning the conferencing system on, adjusting a volume of the conferencing system up and down, initiating an audio and/or video conference call, ending a call, presenting content, sharing a presentation, reporting a problem, accessing contacts, accessing a calendar, locking a room, etc.

As described above, the personal user interface can provide a consistent user interface across multiple conferencing systems, such that a user may download the consistent user interface to multiple mobile computing devices, multiple conferencing system controllers, etc. This may allow for consistent updates of application programming interfaces for compatible conferencing systems.

The videoconferencing codecs 106A and 106B may include a room-based videoconferencing codec, a mobile cart-based videoconferencing codec, a mobile phone-based videoconferencing codec, a mobile tablet-based videoconferencing codec, etc. The videoconferencing codec includes a coder/decoder for audio and for video, and may be used for a conference call including both audio and video, for a call involving only audio if desired, etc.

In some embodiments, the smartphone 112 may be configured to parse information (e.g., calendar events, emails, etc.) stored on the mobile smartphone 108 according to a parsing protocol to obtain information regarding a scheduled conference call, and to transmit at least a portion of the information regarding the scheduled conference call to the server 102 in response to user input. The server 102 is configured to transmit the information regarding the scheduled conference call to the system controller 108A or 108B, and the system controller 108A or 108B is configured to initiate the scheduled conference call via the videoconferencing codec 106A or 106B.

The smartphone app may use one or more libraries to pull information (e.g., calendar event data, emails, etc.) from the smartphone 112, and parse the information to obtain details regarding a scheduled conference call. For example, calendar invites, email invites, etc. from videoconferencing services typically have a standardized format that may easily be gathered and processed by the smartphone app. For example, calendar events, emails, etc., stored on the smartphone 112 may be parsed by the smartphone app to search for indicators of a scheduled conference call.

In some embodiments, the smartphone app may search multiple stored calendar events for one or more text and/or numeric strings indicative of the scheduled conference call. For example, a calendar event that includes a session initiation protocol (SIP) uniform resource identifier (URI), a videoconferencing phone number, a videoconferencing meeting number, a personal identification (PIN) number, a passcode, etc., may be indicative of a scheduled conference call.

The smartphone app may search multiple stored calendar events, emails, etc. to identify text and/or numeric strings including a SIP URI, videoconferencing phone number, meeting number, PIN number, passcode, etc., to identify an upcoming scheduled conference call. In some cases, videoconferencing providers may use a standard textual format for invites to conference calls, and the smartphone app may search the multiple calendar events to identify formatted text that corresponds to a specific videoconferencing provider invite, which indicates an upcoming scheduled conference call.

The smartphone app may parse calendar events within a defined time period to search for scheduled conference calls. For example, the smartphone app could search calendar events within an hour from a current time, within a day, within a week, etc.

The control application can then pass the gathered information through a secure sockets layer (SSL) connection over the Internet, using any suitable Internet communication interface (e.g., WiFi, cellular, etc.). The gathered information may be transmitted to a gateway server based in a cloud (e.g., an AMAZON Web Services (AWS) cloud, etc.). The server acts as a proxy to direct the application content to the correct conferencing system controller, which contains the appropriate APIs to control a connected codec (e.g., a video codec, an audio codec, etc.), other conferencing components, etc.

The conferencing system controller translates the information received from the application into the correct API to communicate with the codec to make a conferencing call. The information received from the application may include an SIP URI, a phone number, a meeting number, a PIN number, etc.

As described above, the system may not be proprietary to any specific code or service, such that the system can use any codec, any web based conferencing application, etc. Call control features can be performed local to the controller, such the call control features are handled inside of a customer's network instead of in a cloud. Therefore, the Internet may be used as a common network instead of a proprietary cloud.

The smartphone 112 may transmit the information to the server 102 using a secure encrypted transport layer security (TLS) channel. For example, the smartphone app may organize the information into a specified format (e.g., JavaScript Object Notation (JSON) format, etc.) for transmission to the server 102.

For example, when accessing personal contacts, calendar data, etc. of a user on the smartphone, the smartphone app can transmit normalized data to the server in a standard format (e.g., in a format documented in the Cisco CE9.0 API, etc.). This may provide a standard format in which the system controller can add any conferencing room or site-specific information to the dial string (e.g., prepending "9", a country code, etc.) to the normalized number. In this case, the system controller may only have access to the string that is presented, and may not have access to the entirety of the personal contacts on the smartphone.

When accessing a personal calendar on the smartphone, the mobile application may optionally use calendar invites stored locally on the smartphone and parse the data to search for indicators of a conference call from a supported provider. The smartphone app can organize the data into a format for transmission to the server to automate the conference call process with all associated conferencing components in the conferencing room.

The transmitted information may not include personal data of the smartphone 112, so personal data of the smartphone 112 may not be stored on the server 102 or the system controller 108A or 108B to provide privacy to a user of the smartphone 112. Similarly, local videoconferencing room data of the system controller 108A or 108B may not be stored on the smartphone 112, to protect privacy of local videoconferencing room data.

Controls for the system controller can be stored in the presentation layer of the smartphone app. This presentation layer can emulate controls, APIs, etc. of a videoconferencing codec (e.g., a CISCO conferencing codec, etc.) to provide a consistent set of external facing protocols regardless of the conferencing equipment that is actually installed in the room. Example features include making and ending conferencing calls, muting and unmuting microphones, sharing content, volume control, etc.

These features include commands that can be sent from the smartphone to the server, to the system controller, and then to conferencing equipment connected with the system controller. States of these functions can be reported from the connected conferencing equipment back to the system controller though acknowledgement signals transmitted by APIs of the connected conferencing equipment, and the system controller can send the information back to the smartphone.

The smartphone may optionally be configured to report problems with the videoconferencing system through email, through CISCO SPARK, etc. A user may be presented with a text box and a camera icon that allows the user to take a picture of a current conferencing room issue with a camera of the smartphone.

If the smartphone is connected directly to an individual videoconferencing room (e.g., to the system controller in a videoconferencing room, etc.), information associated with the conferencing room can be transmitted to a recipient of a problem support request. If the smartphone is not connected directly with an individual conferencing room, a closest conferencing room may be reported without capturing individual room data.

In some embodiments, the smartphone may include a toggle switch, button, etc. in the smartphone app that allows a user to lock others from controlling a conferencing room (e.g., when conducting an important meeting, a secure meeting, etc.). This may prevent others from being able to connect to the conferencing system controller in the conferencing room, may prevent others from controlling the conferencing system controller, etc.

Figure 8:
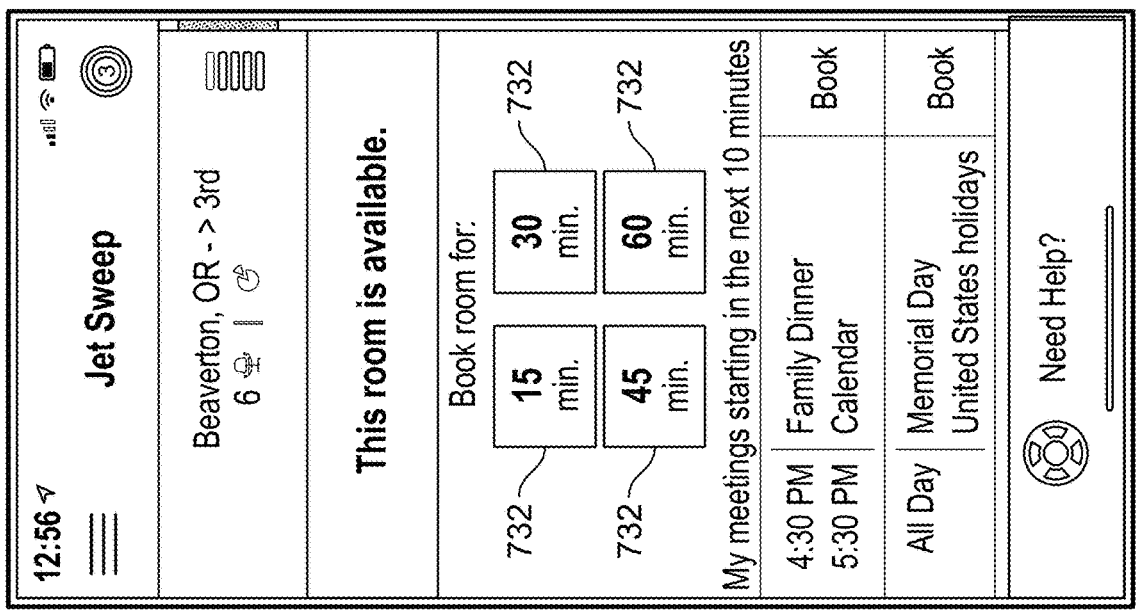
FIG. 8 is an illustration an example user interface illustrating a join button for initiating a videoconferencing call.

In some embodiments, the smartphone 112 may display a join button 834 on the user interface 526 according to the obtained information regarding the scheduled conference call, as shown in FIG. 8. The smartphone 108 may then transmit at least a portion of the obtained information regarding the scheduled conference call to the server 102 in response to activation of the join button 836 by the user 113.

In some embodiments, the smartphone app determines a start time of the scheduled conference call according to the obtained information, and displays, highlights, etc. the join button 836 on the user interface 526 a defined time period before the determined start time of the scheduled conference call. As shown in FIG. 8, the join button 836 may be highlighted five minutes prior to the scheduled conference call associated with the join button 836, while another join button 838 is not highlighted because a current time is more than five minutes prior to the scheduled conference call associated with the join button 836.

For example, the smartphone app could display the join button 836 on the user interface 526 at least one minute before the scheduled conference call, at least five minutes before the scheduled conference call, at least one hour before the scheduled conference call, etc.

Alternatively, or in addition, the smartphone app may display the join button 836 on the user interface 526 a defined time period after the determined start time of the scheduled conference call. For example, the smartphone app could display the join button 836 on the user interface 526 at least one minute after the scheduled conference call, at least five minutes after the scheduled conference call, at least one hour after the scheduled conference call, etc.

The join button 838 may include any suitable icon, toggle, switch, field, etc., such as the highlighted green square on the user interface 526 in FIG. 8. The join button 836 may be displayed on a touchscreen of the smartphone 112, etc. In other embodiments, the smartphone 112 may not display a join button and the user may initiate the scheduled conference call by providing input other than activation of a join button.

As described above, the system 100 may allow for joining a conference call using a simple (e.g., one-button) connection from the smartphone 112. For example, as shown in FIG. 8, the user 113 may simply enter a videoconferencing room and the smartphone app on the smartphone 112, then press the join button 836 on the user interface 526 of the smartphone 112 to start a scheduled conference call. Videoconferencing call control, information, etc. may be handled in the background with respect to the user 113. For example, a user may not have to locate a dialer for a meeting, may not have to dial a phone number for the conferencing service (e.g., using WEBEX, GOTOMEETING, ZOOM, BLUE JEAN NETWORKS, SKYPE, CISCO, etc.), may not have to input an ID or PIN for the meeting, etc.

In order to leave a room, a "Leave Room" button 834 displayed on user interface 526 of the smartphone 112 may automatically disconnect the initiated conference call when the smartphone 112 leaves the physical proximity of the conferencing room (e.g., leaves a proximity distance threshold of a beacon associated with the system controller 108A or 108B, etc.), as shown in FIG. 8. The system controller 108A or 108B may disconnect communication with the smartphone 112 via the server 102 and shut down when the conferencing room is determined to be vacant.

The conferencing system controllers, mobile computing devices, etc. described herein may be configured to perform operations using any suitable combination of hardware and software. For example, the system controller may include any suitable circuitry, logic gates, microprocessor(s), computer-executable instructions stored in memory, etc. operable to cause the system controller to perform actions described herein.

In some embodiments, a user may be able to walk into a conferencing room with a mobile computing device, and a conferencing system controller can send a schedule for the conferencing room to the mobile computing device (e.g., instead of having a touch screen outside of the room, etc.). The mobile communication device may be able to control the conferencing room though the connection with the conferencing system controller, may be able to manage reservations for the conferencing room though the connection with the conferencing system controller, etc. Current occupancy of conferencing rooms in proximity to the mobile computing device may be displayed on the mobile computing device.

The location-based control approaches described herein may provide wayfinding functionality as described above. For example, the location beacons, location-based services of the mobile computing device, etc. may be used to orient a user among multiple conference rooms, to navigate the user between multiple conference rooms, etc.

In some embodiments, location-based control approaches may allow for room booking (e.g., reservations, etc.) as described above. For example, a user may reserve a room by physically entering a room before generating the reservation, to confirm that the user is reserving the correct room.

Location-based control approaches may be used for attendance, by confirming the conference call members that are present during a conference call based on proximity detection. Emergency notification can be provided to alert all user(s) within a certain proximity of a conferencing system, etc. In some embodiments, training videos can be implemented based on location, so that users attend the correct training video, an appropriate training video for a specific conference room/system is provided to a user, etc.

According to another example embodiment, a videoconferencing system includes multiple videoconferencing rooms, and a server adapted to store information regarding each videoconferencing room. Each videoconferencing room includes a videoconferencing codec and a system controller in communication with the videoconferencing codec via one or more wired and/or wireless communication networks to control the videoconferencing codec, the system controller in communication with the server via the one or more wired and/or wireless communication networks. The system also includes a mobile computing device including a user interface. The mobile computing device configured to communicate with the server via the one or more wired and/or wireless communication networks to exchange data with the server to determine whether at least one of the videoconferencing rooms is within a defined proximity of the mobile computing device. The mobile computing device is further configured to obtain information regarding a scheduled conference call from calendar information stored on the mobile computing device.

According to yet another example embodiment, a mobile computing device is configured to exchange data with a server to determine whether at least one of multiple videoconferencing rooms is within a defined proximity of the mobile computing device, and in response to determining that at least one of the videoconferencing rooms is within the defined proximity, and in response to the user selecting said at least one of the videoconferencing rooms, transmit one or more commands to a server to transmit the one or more commands to a system controller located in said at least one of the videoconferencing rooms.

According to a further example embodiment, a method of controlling a conference call includes determining whether at least one of multiple videoconferencing rooms is within a defined proximity of a mobile computing device, and in response to determining that at least one of the videoconferencing rooms is within the defined proximity, and in response to the user selecting said at least one of the videoconferencing rooms, transmitting one or more commands to a server to transmit the one or more commands to a system controller located in said at least one of the videoconferencing rooms.

According to another example embodiment, a system controller is configured to receive one or more commands from a server, the one or more commands transmitted to the server by a mobile computing device in response to determining whether a videoconferencing room in which the system controller is located is within a defined proximity of a mobile computing device.

Example embodiments described herein may provide one or more (or none) of the following advantages: location-based connection between a mobile computing device and a conferencing system controller, use of the Internet as a common network between the mobile computing device and the conferencing system controller, maintenance of a consistent downloadable user interface across multiple different conferencing systems, and consistent updates of application programming interfaces for compatible conferencing system equipment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for controlling a conference call in a videoconferencing system including multiple videoconferencing rooms, a server and a mobile computing device, each videoconferencing room including a videoconferencing codec and a system controller, the server adapted to store information about each videoconferencing room and in communication with each system controller via one or more wired and/or wireless communication networks, and the mobile computing device including a user interface, the method comprising:
  determining, by the mobile computing device, whether at least one of the multiple videoconferencing rooms is within a defined proximity of the mobile computing device; and
  in response to determining that at least one of the multiple videoconferencing rooms is within the defined proximity of the mobile computing device, and in response to the user selecting said at least one of the videoconferencing rooms via the user interface of the mobile device:
  transmitting, by the mobile computing device via the server, one or more commands to the system controller located in said at least one of the videoconferencing rooms, to control the videoconferencing codec located in said at least one of the videoconferencing rooms according to the one or more commands to establish or control a videoconference in said at least one of the videoconferencing rooms.

2. The method of claim 1, further comprising:
  receiving, by the mobile computing device, one or more wireless signals, wherein:
  determining includes determining whether the at least one of multiple videoconferencing rooms is within the defined proximity of the mobile computing device according to the one or more wireless signals received by the mobile computing device.

3. The method of claim 1, wherein:
  the videoconferencing system includes one or more wireless beacons;
  each beacon includes a unique universal identifier (UUID);
  the UUID of each beacon corresponds to a different one of the multiple videoconferencing rooms;
  the method further comprises identifying, by the mobile computing device, the UUID of at least one of the one or more wireless beacons; and
  determining includes determining whether the at least one of the videoconferencing rooms is within the defined proximity of the mobile computing device by determining the videoconferencing room corresponding to the identified UUID.

4. The method of claim 1, wherein:
the videoconferencing system includes one or more wireless beacons comprising at least one of a short-range wireless communication BLUETOOTH beacon, a WiFi beacon, a radio-frequency identification (RFID) beacon, and a near-field communication (NFC) beacon; and
determining whether at least one of multiple videoconferencing rooms is within a defined proximity of the mobile computing device includes determining a proximity distance of the mobile computing device from each wireless beacon according to a relative signal strength indicator (RSSI) for each wireless beacon.

5. The method of claim 1, wherein:
each of the multiple videoconferencing rooms is associated with a global positioning system (GPS) location corresponding to a location of the videoconferencing room;
the method further comprises obtaining, by the mobile computing device, a GPS location of the mobile computing device; and
determining includes determining whether the at least one of the videoconferencing rooms is within the defined proximity of the mobile computing device by identifying the videoconferencing room having an associated GPS location within the defined proximity of the obtained GPS location of the mobile computing device.

6. The method of claim 1, wherein:
the videoconferencing system includes multiple wireless access points;
each of the multiple videoconferencing rooms is associated with a defined wireless signal strength signature corresponding to received signal strengths from each of the multiple wireless access points at a location of the videoconferencing room;
the method further comprises obtaining, by the mobile computing device, a received signal strength for one or more of the multiple wireless access points; and
determining includes determining whether the at least one of the videoconferencing rooms is within the defined proximity of the mobile computing device by identifying the videoconferencing room having the defined wireless signal strength signature corresponding to the received signal strengths obtained by the mobile computing device.

7. The method of claim 1, further comprising displaying at least one of a name of said at least one of the videoconferencing rooms within the defined proximity of the mobile computing device, an occupancy status of said at least one of the videoconferencing rooms, a list of available technologies in said at least one of the videoconferencing rooms, a number of available seats in said at least one of the videoconferencing rooms, and a signal strength in said at least one of the videoconferencing rooms.

8. The method of claim 1, further comprising:
receiving, by the mobile computing device, a local videoconferencing room calendar from the system controller in said at least one of the videoconferencing rooms;
determining, by the mobile computing device, whether said at least one of the videoconferencing rooms within the defined proximity of the mobile computing device is available according to the local videoconferencing room calendar received from the system controller in said at least one of the videoconferencing rooms; and
transmitting a reservation request to the system controller to store a reservation in the local videoconferencing room calendar of the system controller.

9. The method of claim 1, wherein the one or more commands include at least one of a system turn on command, a volume control command, an audio and/or video call command, an end call command, a mute and/or unmute microphone command, a presentation share command, a present content command, a report problem command, an access contacts command, an access calendar command, and a lock room command.

10. The method of claim 1, wherein transmitting one or more commands includes transmitting, by the mobile computing device, one or more commands to the server via the one or more wired and/or wireless communication networks using a secure encrypted transport layer security (TLS) channel, where personal data of the mobile computing device is not stored on the system controller of said at least one of the videoconferencing rooms within the defined proximity of the mobile computing device, and local room data of the system controller is not stored on the mobile computing device.

11. The method of claim 1, wherein the mobile computing includes a camera, the method further comprising:
in response to a report problem request input by a user via the user interface of the mobile computing device, capturing a picture indicative of a conferencing room issue via the camera of the mobile computing device; and
transmitting, by the mobile computing device, the picture indicative of the conferencing room issue to the server.

12. The method of claim 1, further comprising:
displaying, by the mobile computing device, a lock room button on the user interface of the mobile computing device; and
in response to activation of the lock room button by the user, transmitting a lock request to the server to relay the lock request to the system controller of the at least one of the videoconferencing rooms within the defined proximity of the mobile computing device to inhibit other mobile computing devices from controlling the system controller.

13. The method of claim 1, further comprising:
obtaining, by the mobile computing device, a videoconferencing room schedule from the system controller of said at least one of the videoconferencing rooms within the defined proximity of the mobile computing device; and at least one of:
displaying the obtained conferencing room schedule on the user interface of the mobile computing device;
transmitting a reservation request to the server to relay the reservation request to the system controller to book a reservation of a videoconferencing room; and
obtaining a current occupancy from multiple system controllers within the defined proximity of the mobile computing device and displaying the obtained current occupancies.

14. The method of claim 1, further comprising displaying, by the mobile computing device, one or more commands on the user interface to transmit to the server to control the videoconferencing codec, wherein the one or more commands are displayed on the user interface as a consistent set of external facing protocols regardless of a type of the videoconferencing codec.

15. A mobile computing device comprising:
a communication interface in communication with a server of a videoconferencing system, the videoconferencing system including multiple videoconferencing rooms each including a videoconferencing codec and a system controller, the server adapted to store information about each videoconferencing room and in communication with each system controller via the one or more wired and/or wireless communication networks;

a memory for storing computer-executable instructions; and a processor configured to execute the computer-executable instructions stored in the memory to:

communicate with the server via the one or more wired and/or wireless communication networks to exchange data with the server to determine whether at least one of multiple videoconferencing rooms is within a defined proximity of the mobile computing device; and in response to determining that at least one of the videoconferencing rooms is within the defined proximity of the mobile computing device:

transmit one or more commands, via the server, to the system controller located in said at least one of the videoconferencing rooms, to control the videoconferencing codec located in said at least one of the videoconferencing rooms according to the one or more commands to establish or control a videoconference in said at least one of the videoconferencing rooms.

16. The mobile computing device of claim 15, wherein the processor is configured to execute the computer-executable instructions stored in the memory to:

receiving one or more wireless signals; and exchange data with the server to determine whether at least one of the videoconferencing rooms is within the defined proximity of the mobile computing device according to the one or more wireless signals received by the mobile computing device.

17. The mobile computing device of claim 15, wherein:

the videoconferencing system includes one or more wireless beacons;

each beacon includes a unique universal identifier (UUID);

the UUID of each beacon corresponds to a different one of the multiple videoconferencing rooms; and the processor is configured to execute the computer-executable instructions stored in the memory to:

identify the UUID of at least one of the one or more wireless beacons; and exchange data with the server to determine whether at least one of the videoconferencing rooms is within the defined proximity of the mobile computing device by determining the videoconferencing room corresponding to the identified UUID.

18. The mobile computing device of claim 15, wherein:

the videoconferencing system includes one or more wireless beacons comprising at least one of a short-range wireless communication BLUETOOTH beacon, a WiFi beacon, a radio-frequency identification (RFID) beacon, and a near-field communication (NFC) beacon; and the processor is configured to execute the computer-executable instructions stored in the memory to determine whether at least one of multiple videoconferencing rooms is within a defined proximity of the mobile computing device by determining a proximity distance of the mobile computing device from each wireless beacon according to a relative signal strength indicator (RSSI) for each wireless beacon.

19. The mobile computing device of claim 15, wherein:

each of the multiple videoconferencing rooms is associated with a global positioning system (GPS) location corresponding to a location of the videoconferencing room; and the processor is configured to execute the computer-executable instructions stored in the memory to:

obtain a GPS location of the mobile computing device; and exchange data with the server to determine whether at least one of the videoconferencing rooms is within the defined proximity of the mobile computing device by identifying the videoconferencing room having an associated GPS location within the defined proximity of the obtained GPS location of the mobile computing device.

20. A system controller for use in a videoconferencing system including multiple videoconferencing rooms each including a videoconferencing codec, the system controller located in one of the videoconferencing rooms, the system controller comprising:

a communication interface in communication with a videoconferencing codec located in the same videoconferencing room as the system controller, via one or more wired and/or wireless communication networks;

a memory configured to store information about the videoconferencing room in which the system controller is located, and computer-executable instructions; and a processor configured to execute the computer-executable instructions stored in the memory to:

receive one or more commands transmitted by a mobile computing device in response to determining whether a videoconferencing room in which the system controller is located is within a defined proximity of the mobile computing device; and control, via the communication interface, the videoconferencing codec located in the same videoconferencing room as the system controller, according to the one or more commands to establish or control a videoconference in the same videoconferencing room.

* * * * *